(12) United States Patent
Huntington, II et al.

(10) Patent No.: US 6,907,524 B1
(45) Date of Patent: Jun. 14, 2005

(54) EXTENSIBLE FIRMWARE INTERFACE VIRUS SCAN

(75) Inventors: Jonathan T. Huntington, II, Salem, MA (US); Richard A. Bramley, Jr., Mansfield, MA (US)

(73) Assignee: Phoenix Technologies Ltd., Milpitas, CA (US)

( * ) Notice: Subject to any disclaimer, the term of this patent is extended or adjusted under 35 U.S.C. 154(b) by 737 days.

(21) Appl. No.: 09/687,008

(22) Filed: Oct. 13, 2000

(51) Int. Cl.[7] .............................. H04L 9/00; H04K 1/00
(52) U.S. Cl. ........................................ 713/164; 380/28
(58) Field of Search ................................. 713/164, 200, 713/1, 2; 380/28

(56) References Cited

U.S. PATENT DOCUMENTS

| | | | |
|---|---|---|---|
| 4,918,653 A | | 4/1990 | Johri et al. |
| 5,032,979 A | | 7/1991 | Hecht et al. |
| 5,590,266 A | | 12/1996 | Carson et al. |
| 5,590,288 A | * | 12/1996 | Castor et al. ............... 709/201 |
| 5,764,889 A | | 6/1998 | Ault et al. |
| 5,796,830 A | | 8/1998 | Johnson et al. |
| 5,815,573 A | | 9/1998 | Johnson et al. |
| 5,828,831 A | * | 10/1998 | Kong ......................... 713/200 |
| 6,026,374 A | | 2/2000 | Chess |
| 6,442,623 B1 | * | 8/2002 | Kim ............................ 710/8 |

OTHER PUBLICATIONS

Extensible Firmware Interface Specification, Apr. 19, 2000, Intel, Version 0.99, pp. 317–323 (full text available at http://www.intel.com/technology/ef/EFISpec_V099.pdf).*

Mike Magee, Merced: what meaneth the Extensible Firmware Interface, Sep. 8, 1999.*

Mark Doran, Extensible Firmware Interface: booting the new generation of Intel Architecture platforms, Sep. 1, 1999, Intel Labs.*

* cited by examiner

*Primary Examiner*—Guy J. Lamarre

(57) ABSTRACT

A secure method for implementing virus protection on a computer system including an Extensible Firmware Interface (EFI), a hard disk, a nonvolatile memory and a BIOS is disclosed. A command is added to the command shell of the EFI which results in the automatic copying of the boot sector of the hard disk to the nonvolatile memory when the computer system is initialized. The boot sector of the hard disk is automatically read back from the nonvolatile memory on each boot, which bypasses the boot sector access of the hard disk during system initialization; thereby, protecting the computer system from and eliminating potential viruses. The command shell of the EFI may also be modified to include a command to include a security signature input field. The required signature is provided by the user prior to updating the stored boot sector.

12 Claims, 2 Drawing Sheets

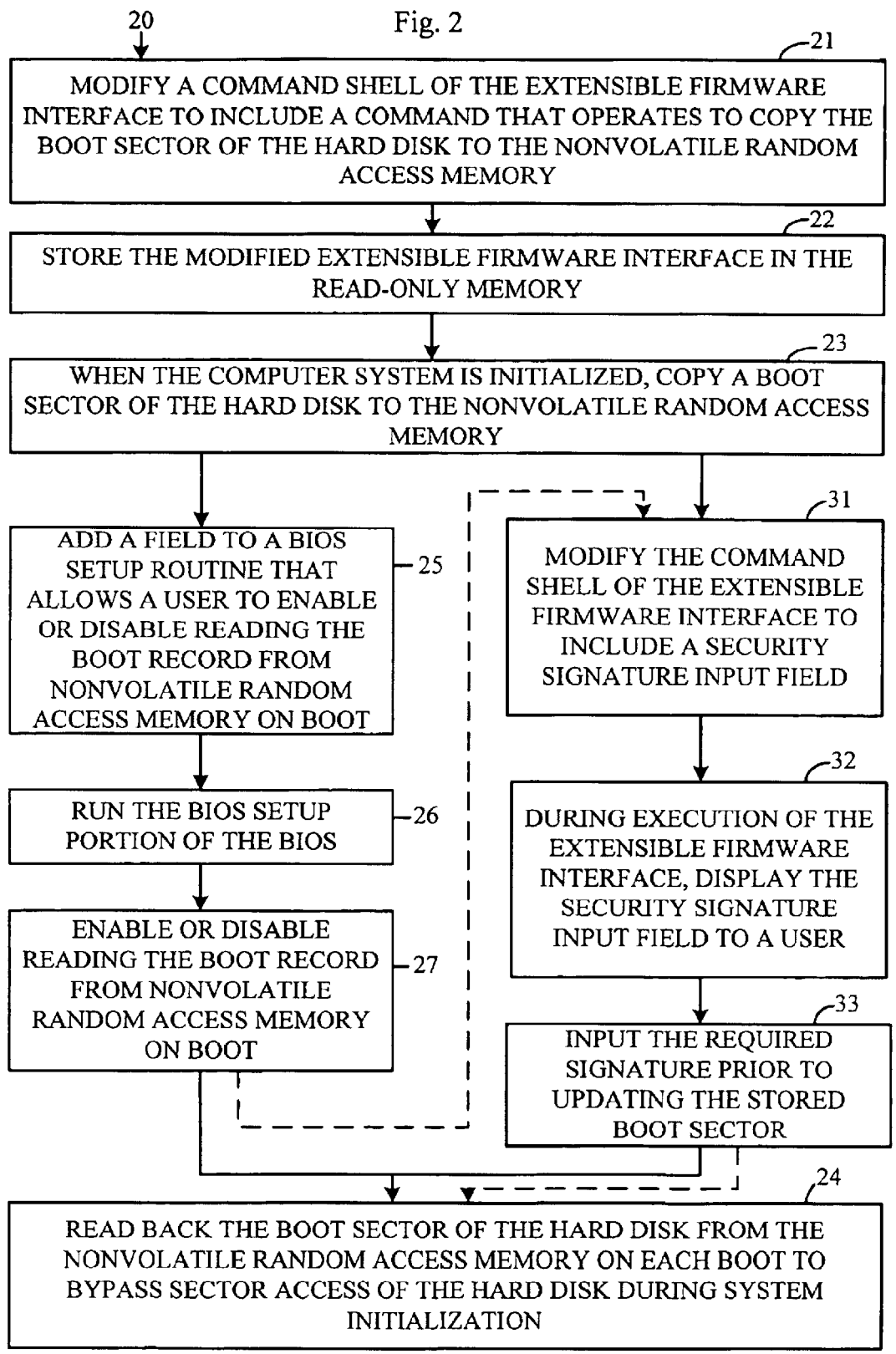

EXTENSIBLE FIRMWARE INTERFACE VIRUS SCAN

BACKGROUND

The present invention relates generally to computer systems and methods, and more particularly, to methods that provide protection from software viruses on computer systems that use an Extensible Firmware Interface.

Viruses are code that is hidden or contained in a file or software application that, when processed on a receiving computer, causes problematic activity on the receiving computer. The virus may take many forms, such as one that is part of a file attached to an E-mail message, which when opened, activates embedded code that creates havoc on the receiving computer or causes the receiving computer to initiate unwanted activities.

Virus protection is a large business and there are a number or organizations whose primary goal is to detect and produce anti-virus software that thwarts existing and new viruses. These organizations include Symantec Corporation and McAfee, for example. These organizations are dedicated to virus protection and remediation, and market various programs that provide for virus protection on various computer platforms.

The programs developed by these organizations operate to scan hard disk drives and scan incoming E-mail files and files input via floppy disks or other media to detect and eradicate the virus from the computer. The programs developed by these organizations work with PCs on DOS, Windows and Unix Operating systems, and other platforms and operating systems as well.

A new Industry standard ROM based operating system has been developed which is known as EFI, or the Extensible Firmware Interface, that operates to replace DOS (Disk Operating System) functionality. As such, the EFI is controlled by the basic input and output system (BIOS) of the computer. The EFI is part of the BIOS within a flash nonvolatile RAM, and it is guaranteed to execute before any other operating systems are loaded or disk access is allowed. Virus protection is not generally available for this ROM based operating system. The present invention addresses this need.

It is an objective of the present invention to provide for a virus protection method (software or firmware) for use with computer systems employing the Extensible Firmware Interface.

SUMMARY OF THE INVENTION

To accomplish the above and other objectives, the present invention provides for a secure method (implemented as software or firmware) for implementing virus protection on a computer system comprising an Extensible Firmware Interface and a basic input and output system (BIOS). The method is designed to protect and remedy potential viruses.

The computer system includes a central processing unit, a hard disk, and a nonvolatile memory, such as a random access memory, a read-only memory or flash memory device. The Extensible Firmware Interface is a ROM-based operating system (i.e. stored in the read-only memory or flash random access memory) that provides disk operating system (DOS) functionality for the computer system, and is controlled by the BIOS.

The Extensible Firmware Interface is a read-only-memory (ROM) based operating system that operates to replace traditional disk operating system (DOS) functionality. The Extensible Firmware Interface is controlled by the basic input and output system and executes before any other operating systems are loaded or disk access is allowed.

The present method includes the following steps: A command shell of the Extensible Firmware Interface is modified to include a command that operates to copy the boot sector of the hard disk to the nonvolatile memory. The modified Extensible Firmware Interface is stored in the nonvolatile memory. When the computer system is initialized (booted), a boot sector of the hard disk is copied to the nonvolatile memory. The boot sector of the hard disk is automatically read back from the nonvolatile memory on each boot, which bypasses the boot sector access of the hard disk during system initialization.

An extra field may be added to a BIOS SETUP routine, which is part of the BIOS, that allows a user to enable or disable reading of the boot record from nonvolatile memory on boot. In implementing this aspect of the present method, the BIOS SETUP routine is run, and the user is prompted to enable or disable reading the boot record from nonvolatile memory on boot. The use of the BIOS SETUP routine allows a user to recover if he or she changes the boot disk or intentionally changes the boot disk's boot record to change the operating system or partition of the hard disk.

The method may also be modified to require entry of a security signature to prevent unauthorized updating of the stored boot sector. In implementing this aspect of the present invention, the command shell of the Extensible Firmware Interface is modified to include a security signature input field. At the appropriate time during execution of the Extensible Firmware Interface the security signature input field is displayed to a user. The required signature is then input by the user prior to updating the stored boot sector.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 is a flow diagram that illustrates an exemplary method in accordance with the principles of the present invention for providing virus protection of a computer system.

DETAILED DESCRIPTION

Figure 1:
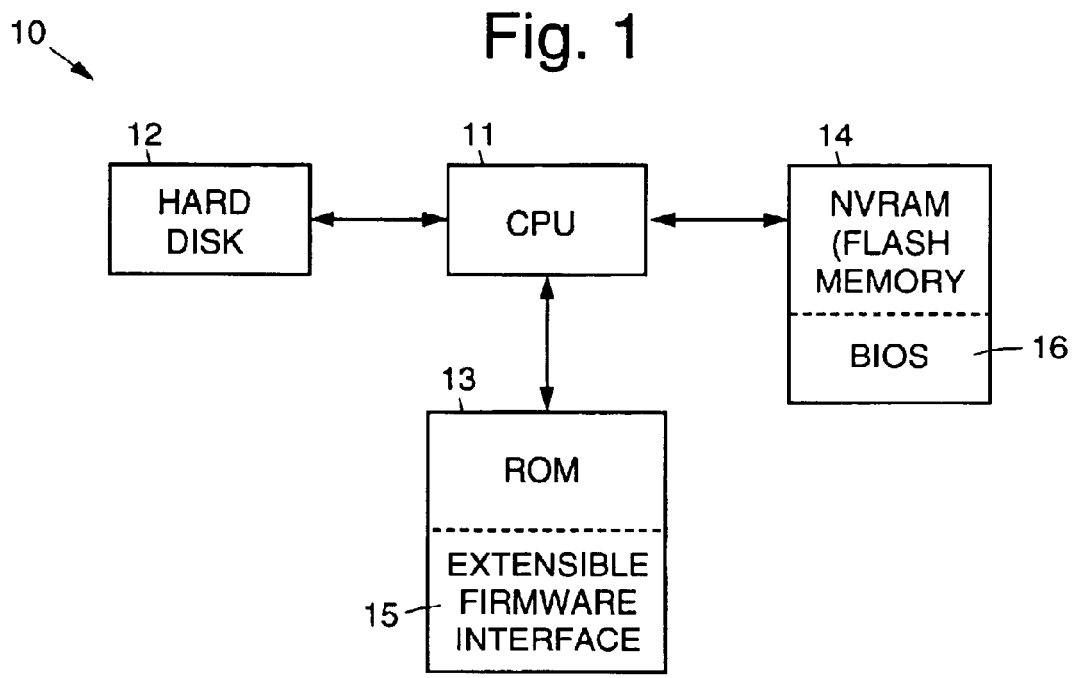
FIG. 1 illustrates a first embodiment of an exemplary computer system in which the present invention is employed.

Referring to the drawing figures, FIG. 1 illustrates a first embodiment of an exemplary computer system 10 in which the present invention is employed. The first embodiment represents a typical older computer system 10 constructed in accordance with the current state of the art.

The computer system 10 includes a central processing unit (CPU) 11, which is coupled to a hard disk 12, a read-only memory (ROM) 13, and a nonvolatile memory, for example, a nonvolatile random access memory (NVRAM) 14, also known as flash memory 14. The computer system 10 also includes an Extensible Firmware Interface (EFI) 15 which is a ROM-based operation system (i.e., stored in the read-only memory 13) that provides disk operating system (DOS) functionality for the computer system 10, along with a basic input and output (BIOS) 16.

In general, ROM and flash devices are considered by BIOS engineers to be substantially the same. Historically, the BIOS was located in ROM but, in modern computer systems, the BIOS and EFI are contained in flash devices, so there is no need for the distinction between ROM and NVRAM (flash) devices. It is to be understood that the present invention does not exclude ROM devices, although substantially all currently produced personal computers are implemented using flash devices. A more current embodiment of the computer system 10 is discussed with reference to FIG. 1a.

The Extensible Firmware Interface 15 comprises a command shell, which is the outermost layer or user interface of this program, and which comprises a command processor interface. The command processor is a program that exccutes operating system commands. The command shell is that part of the command processor that accepts commands. After verifying that the commands are valid, the shell sends them to another part of the command processor to be executed.

The basic input and output system or BIOS 16, is a firmware program that is stored in the nonvolatile random access memory 14 (or flash memory 14). The BIOS 16 brings up the computer system 10 when it is turned on. The Extensible Firmware Interface 15 is controlled by the BIOS 16 and executes before any other operating systems are loaded or access is allowed to the hard disk 12.

The BIOS 16 determines what the computer can do without accessing programs form the hard disk 12 or other media. The BIOS 16 contains code required to control, for example, the keyboard, display screen, disk drives, serial communications along with certain other functions, depending upon the computer system 10.

Figure 1A:
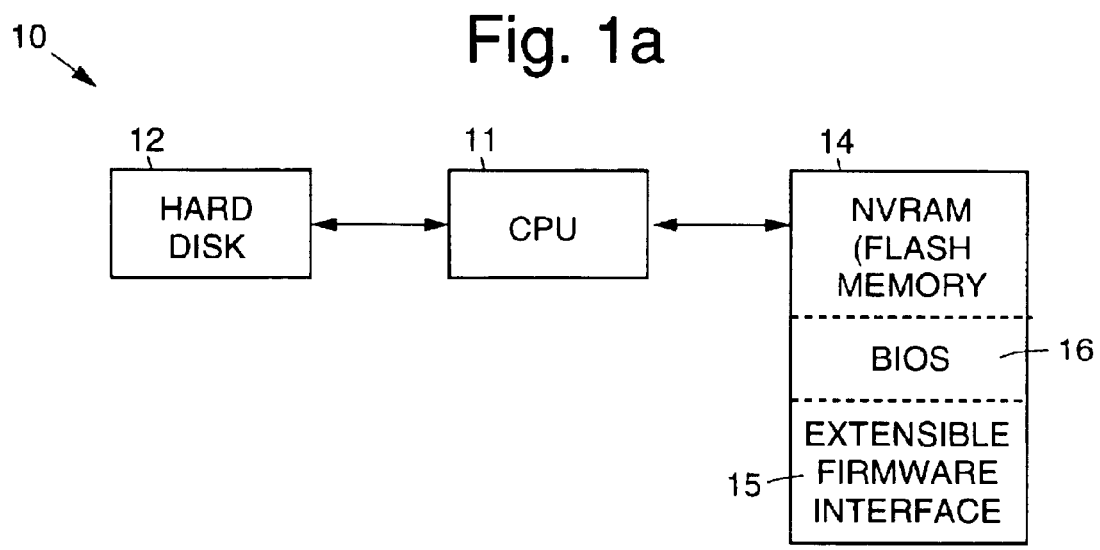
FIG. 1a illustrates a second embodiment of an exemplary computer system in which the present invention is employed.

FIG. 1a illustrates a second embodiment of an exemplary computer system 10 in which the present invention is employed. The second embodiment represents a computer system 10 constructed in accordance with the current state of the art.

The second embodiment of the computer system 10 comprises a central processing unit (CPU) 11, which is coupled to a hard disk 12, and a nonvolatile random access memory (NVRAM) 14, or flash memory 14. The computer system 10 also comprises an Extensible Firmware Interface (EFI) 15 and a basic input and output system (BIOS) 16 stored in the NVRAM 14. The Extensible Firmware Interface 15 and BIOS 16 function as discussed with reference to FIG. 1.

FIG. 2 is a flow diagram that illustrates an exemplary method 20 in accordance with the principles of the present invention for providing virus protection for the computer system 10. The method is designed to protect and remedy potential viruses that are loaded onto the computer system 10.

The method 20 comprises software and preferably firmware that is used in conjunction with a computer system 10 comprising a central processing unit (CPU) 11, a hard disk 12, a nonvolatile memory (NVRAM) 14, a basic input and output system (BIOS) 16, and an Extensible Firmware Interface 15. The software or firmware is stored in and is executed from the nonvolatile memory (NVRAM) 14 for ROM 13) of the computer system 10. The method comprises the following steps.

A command shell of the Extensible Firmware Interface 15 is modified 21 to include a command, referred to as <saveboot>, that operates to copy the boot sector of the hard disk 12 to the nonvolatile random access memory 14. The modified Extensible Firmware Interface 15 is stored 22 in the nonvolatile random access memory 14.

When the computer system 10 is initialized (booted), a boot sector of the hard disk 12 is copied 23 to the nonvolatile random access memory 14. The boot sector of the hard disk 12 is automatically read back 24 from the nonvolatile random access memory 14 on each boot, which bypasses the boot sector access of the hard disk 12 during system initialization.

An extra field may be added 25 to a BIOS SETUP routine, which is part of the BIOS 16, that allows a user to enable or disable reading of the boot record form nonvolatile random access memory 14 on boot. In implementing this aspect of the present method, the BIOS SETUP portion of the BIOS 16 is run 26, and the user is prompted to enable or disable 27 reading of the boot record from nonvolatile random access memory 14 on boot. The use of the BIOS SETUP routine allows a user to recover is he or she changes the boot disk or intentionally changes the boot disk's boot record to change the operating system or partition of the hard disk 12.

The software or firmware that implements the method 20 may also be modified to require entry of a security signature to prevent unauthorized updating of the stored boot sector. In implementing this aspect of the present invention, the command shell of the Extensible Firmware Interface 15 is further modified 31 to include a security signature input field. At the appropriate time during execution of the Extensible Firmware Interface 15 the security signature input field is displayed 32 to a user. The required signature is then input 33 by the user prior to updating the stored boot sector.

The method 20 is fast because the operating system does not need to scan the boot sector for a long list of potential viruses during power on self test (POST). The method 20 is simple because it does not require any additional virus software. In addition to boot sector protection, additional software may be provided during the power on self test to scan for infection signatures in the nonvolatile random access memory 14 on each boot. Signature files may be provided in firmware or the nonvolatile random access memory 14 or from the hard disk 11. Remediation code may also be provided to remove infected boot sectors and viruses found in memory during power on self test. The present virus protection method may also replace or complement other virus protection programs.

Thus, a method that provides protection from software viruses on computer systems that use an extensible firmware interface has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for providing virus protection of a computer system including a central processing unit, a hard disk, a nonvolatile memory, an Extensible Firmware Interface, and a basic input and output system, the method comprising the steps of:

modifying a command shell of the Extensible Firmware Interface to include a command that operates to copy a boot sector of the hard disk to the nonvolatile memory;

storing the modified Extensible Firmware Interface in the nonvolatile memory;

when the computer system is initialized, copying the boot sector of the hard disk to the nonvolatile memory;

reading back the boot sector of the hard disk from the nonvolatile memory on each boot to bypass boot sector access of the hard disk during system initialization.

2. The method recited in claim 1 further comprising the steps of:

adding a field to a BIOS SETUP portion of the BIOS, that allows a user to enable or disable reading the boot record from nonvolatile memory on boot;

running the BIOS SETUP portion of the BIOS; and enabling or disabling reading the boot record from nonvolatile memory on boot.

3. The method recited in claim 2 further comprising the steps of:

further modifying the command shell of the Extensible Firmware Interface to include a security signature input field;

during execution of the Extensible Firmware Interface, displaying the security signature input field to a user; and receiving the required signature prior to updating the stored boot sector.

4. The method recited in claim 1 further comprising the steps of:

further modifying the command shell of the Extensible Firmware Interface to include a security signature field;

during execution of the Extensible Firmware Interface, displaying the security signature input field to a user; and receiving the required signature prior to updating the stored boot sector.

5. The method recited in claim 1 wherein the modified Extensible Firmware Interface is stored in a read-only memory.

6. The method recited in claim 1 wherein the modified Extensible Firmware Interface is stored in a flash memory.

7. A system for providing virus protection, comprising:

a processor; and a nonvolatile memory, coupled to the processor, the nonvolatile memory maintaining instructions that when executed by the processor, cause the processor to:

modify a command shell of an Extensible Firmware Interface to include a command that operates to copy a boot sector of a hard disk to the nonvolatile memory, store the modified Extensible Firmware Interface in the nonvolatile memory, copy the boot sector of the hard disk to the nonvolatile memory when the system is initialized, read back the boot sector of the hard disk from the nonvolatile memory on each boot to bypass boot sector access of the hard disk during system initialization.

8. The system of claim 7, wherein the nonvolatile memory further includes instructions that when executed by the processor, cause the processor to:

add a field to a setup portion of BIOS that allows a user to enable or disable reading of the boot record from nonvolatile memory;

run the setup portion of the BIOS; and enable or disable reading of the boot record from nonvolatile memory on boot.

9. The system of claim 8, wherein the nonvolatile memory further includes instructions that when executed by the processor, cause the processor to:

further modify the command shell to include a security signature input field;

display the security signature input field to a user during execution of an Extensible Firmware Interface; and receiving the security input prior to updating the stored boot sector.

10. The system of claim 7, wherein the nonvolatile memory further includes instructions that when executed by the processor, cause the processor to:

further notify the command shell to include a security signature input field;

display the security signature input field to a user during execution of an Extensible Firmware Interface; and receiving the security input prior to updating the stored boot sector.

11. The system of claim 7, wherein the Extensible Firmware Interface is stored in a read-only memory.

12. The system of claim 7, wherein the Extensible Firmware Interface is stored in a flash memory.

* * * * *